United States Patent
Dang et al.

(10) Patent No.: US 11,436,011 B2
(45) Date of Patent: Sep. 6, 2022

(54) PROCESSING METHOD AND PROCESSING DEVICE WITH MATRIX MULTIPLICATION COMPUTATION

(71) Applicant: Samsung Electronics Co., Ltd., Suwon-si (KR)

(72) Inventors: Bochao Dang, Beijing (CN); Hao Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/172,258

(22) Filed: Feb. 10, 2021

(65) Prior Publication Data

US 2021/0255863 A1 Aug. 19, 2021

(30) Foreign Application Priority Data

Feb. 18, 2020 (CN) .......................... 202010099356.0
Jan. 14, 2021 (KR) .......................... 10-2021-0005389

(51) Int. Cl.
*G06F 9/30* (2018.01)
*G06F 9/38* (2018.01)

(52) U.S. Cl.
CPC ........ *G06F 9/30036* (2013.01); *G06F 9/3001* (2013.01); *G06F 9/3877* (2013.01)

(58) Field of Classification Search
None
See application file for complete search history.

(56) References Cited

U.S. PATENT DOCUMENTS

| 5,629,780 A * | 5/1997 | Watson ............... H04N 19/126 382/250 |
| 7,209,939 B2 | 4/2007 | Castrapel et al. |
| 7,337,205 B2 | 2/2008 | Sazegari |
| 7,536,431 B2 | 5/2009 | Goren et al. |
| 9,189,458 B1* | 11/2015 | Langer ................. H03F 1/3258 |
| 9,711,925 B2 | 7/2017 | Biesse et al. |
| 10,096,133 B1* | 10/2018 | Andreev ............. H03M 7/6064 |
| 10,511,860 B2* | 12/2019 | Chen .................... H04N 19/176 |
| 11,157,237 B2* | 10/2021 | Muralimanohar ........................... G11C 13/0002 |
| 2007/0208792 A1 | 9/2007 | Berjon et al. |
| 2009/0238271 A1* | 9/2009 | Kim ..................... H04N 19/176 375/E7.243 |
| 2012/0078988 A1* | 3/2012 | Miller ..................... G06F 17/16 708/511 |

(Continued)

FOREIGN PATENT DOCUMENTS

CN 109472353 A 3/2019
KR 10-2007-0083652 A 8/2007

*Primary Examiner* — Eric Coleman
(74) *Attorney, Agent, or Firm* — NSIP Law

(57) ABSTRACT

A processor-implemented method includes: determining a first multiplication matrix and a second multiplication matrix, based on an input multiplicand matrix and an input multiplier matrix that are generated from an input signal; determining a matrix to be restored, based on the first multiplication matrix and the second multiplication matrix; determining a matrix restoration constraint value, based on the matrix to be restored; determining a multiplication result of the input multiplicand matrix and the input multiplier matrix, based on the matrix restoration constraint value and the matrix to be restored; and analyzing the input signal based on the multiplication result.

17 Claims, 10 Drawing Sheets

(56) References Cited

U.S. PATENT DOCUMENTS

| | | | |
|---|---|---|---|
| 2012/0203815 A1 | 8/2012 | Yanagisawa | |
| 2017/0270073 A1* | 9/2017 | Badin | G06N 3/063 |
| 2019/0012559 A1 | 1/2019 | Desappan et al. | |
| 2019/0294413 A1* | 9/2019 | Vantrease | G06N 3/08 |
| 2019/0340499 A1* | 11/2019 | Burger | G06N 3/063 |

* cited by examiner

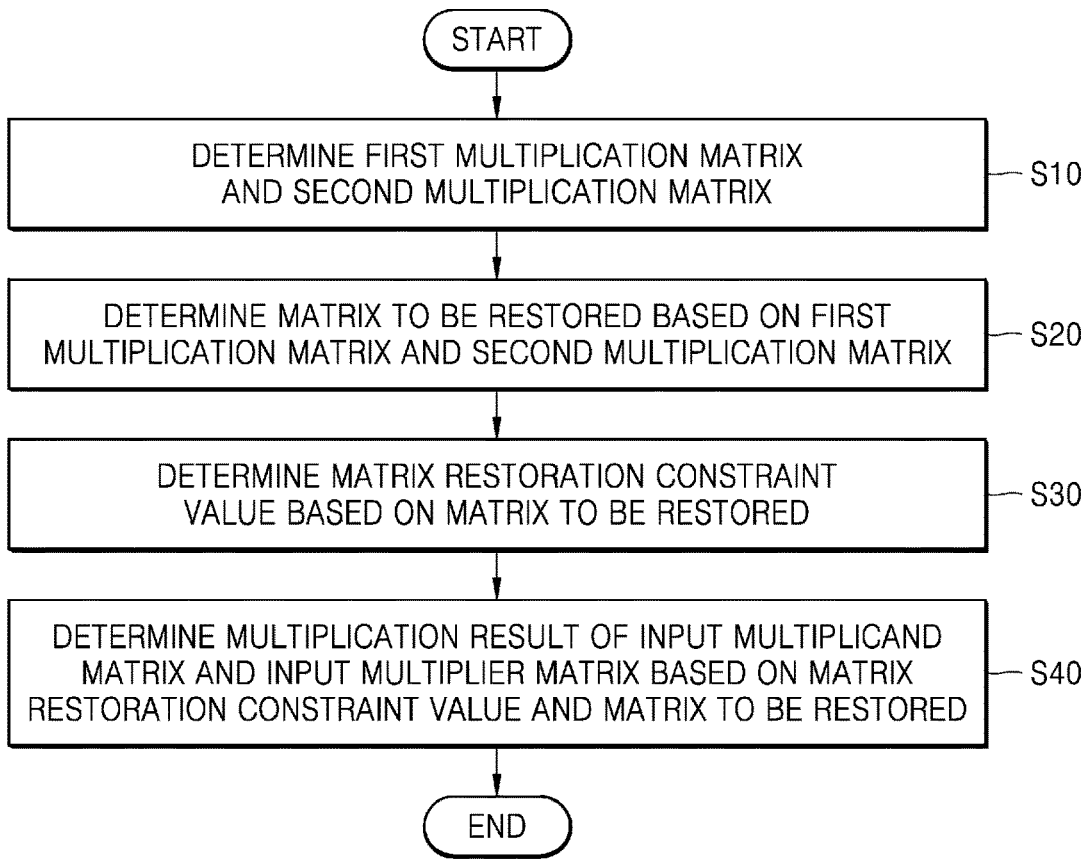

MULTIPLICATION RESULT OF INT8 MATRIX

MULTIPLICATION RESULT OF FLOAT MATRIX

FIG. 10
| 0.1 | -0.1 | -0.5 |
|---|---|---|
| 0.3 | -0.3 | -0.1 |
| 0.3 | -0.3 | -0.5 |
FLOAT MATRIX A
| 0.7 | 0.1 | -0.1 |
|---|---|---|
| 0.0 | 0.2 | 0.7 |
| -0.3 | -0.7 | -1 |
FLOAT MATRIX B
| 25 | -25 | -128 |
|---|---|---|
| 76 | -76 | -25 |
| 76 | -76 | -128 |
INT8 MATRIX A
X
| 88 | 12 | 12 |
|---|---|---|
| 0 | 25 | 88 |
| -38 | -89 | -128 |
INT8 MATRIX B
=
| 364 | -11889 | 17659 |
|---|---|---|
| 5476 | -4100 | 7076 |
| 4240 | -13164 | 20260 |

FIG. 11

| 0.01 | −0.37 | 0.54 |
| 0.17 | −0.13 | 0.22 |
| 0.13 | −0.41 | 0.62 |

↑ ROUND OFF

| 0.0111 | 0.3703 | 0.5404 |
| 0.1676 | −0.1277 | 0.2165 |
| 0.1298 | −0.41 | 0.62 |

↑ INVERSE QUANTIZATION

| 364 | −11889 | 17659 |
| 5476 | −4100 | 7076 |
| 4240 | −13164 | 20260 |

PROCESSING METHOD AND PROCESSING DEVICE WITH MATRIX MULTIPLICATION COMPUTATION

CROSS-REFERENCE TO RELATED APPLICATIONS

This application claims the benefit under 35 U.S.C. § 119(a) of Chinese Patent Application No. 202010099356.0, filed on Feb. 18, 2020 in the Chinese Patent Office, and Korean Patent Application No. 10-2021-0005389, filed on Jan. 14, 2021 in the Korean Intellectual Property Office, the entire disclosures of which are incorporated herein by reference for all purposes.

BACKGROUND

1. Field

The following description relates to computer technology, and more particularly, to a processing method and a processing device with matrix multiplication computation.

2. Description of Related Art

A matrix is an important basic concept in mathematics. An M×N matrix is a rectangular array in which elements are arranged in M rows and N column elements. At present, matrix multiplication is an important operation in data computing when a graphic processor (GPU) performs image processing, input trajectory analysis for handwriting recognition, and/or input audio analysis for speech recognition.

Common computation methods of matrix multiplication include the following two methods.

(1) General Matrix Multiplication (GEMM)

As shown in FIG. 1, element values of the elements in an m-th row and an n-th column in a matrix C that is a multiplication result of a general matrix multiplication are computed as the inner product of a row vector in the m-th row of a matrix A and a column vector in the n-th column of a matrix B. Taking the general matrix multiplication in FIG. 1 as an example, when the element values of the elements in a first row and a first column in the matrix C are computed, the inner product of a row vector in the first row of the matrix A and a column vector in the first column of the matrix B needs to be computed, which is (0.6, 0.4, 0.5)·(0.3, 1.1, 0.0)=0.6×0.3+0.4×1.1+0.5×0.0=0.62≈0.6. A multiplication result of the remaining elements of the matrix C is similarly computed.

With regard to a computation mode of the general matrix multiplication, when a floating matrix (a float matrix) multiplication is required, a hardware device needs to support multiplication of float type data, and a device supporting an integer type (int8 type) data computation may not complete the float matrix multiplication using the general matrix multiplication.

In addition, the multiplication operation for float type data used in the general matrix multiplication is relatively time consuming in a computing device and occupies a large amount of memory.

(2) Quantization Matrix Multiplication

Google implemented quantization and inverse quantization methods in tensorflow, wherein the maximum value and minimum value required for inverse quantization are predicted in a training process, and both values remain unchanged in an inverse quantization operation, such that the element values of all elements of a float result matrix of an inference process are all inverse quantized with fixed maximum and minimum intervals.

Because the maximum and minimum required for inverse quantization in the quantization matrix multiplication are fixed empirical values, processing each matrix multiplication by using the fixed empirical values causes large computational errors.

In addition, in the quantization matrix multiplication, because the estimated maximum and minimum need to satisfy the requirements of all matrix multiplications, the computation with respect to maximum and minimum is complicated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes: determining a first multiplication matrix and a second multiplication matrix, based on an input multiplicand matrix and an input multiplier matrix that are generated from an input signal; determining a matrix to be restored, based on the first multiplication matrix and the second multiplication matrix; determining a matrix restoration constraint value, based on the matrix to be restored; determining a multiplication result of the input multiplicand matrix and the input multiplier matrix, based on the matrix restoration constraint value and the matrix to be restored; and analyzing the input signal based on the multiplication result.

The determining of the first multiplication matrix and the second multiplication matrix may include: quantizing elements of the input multiplicand matrix and the input multiplier matrix, based on a positive number interval of a multiplication matrix value range and a negative number interval of the multiplication matrix value range, to obtain the first multiplication matrix and the second multiplication matrix. A numerical range of the positive number interval may be asymmetric with a numerical range of the negative number interval.

The determining of the matrix restoration constraint value may include: determining a position where a certain reference value in the matrix to be restored is present; extracting a row vector and a column vector corresponding to the position where the certain reference value is present from the input multiplicand matrix and the input multiplier matrix, respectively; and determining the matrix restoration constraint value by using the row vector and the column vector.

The matrix restoration constraint value may include a constraint maximum value and a constraint minimum value, and the certain reference value may include an element maximum value and an element minimum value. The constraint maximum value may be determined by: determining a first position where the element maximum value in the matrix to be restored is present, extracting a first row vector corresponding to a number of a row in which the first position is present from the input multiplicand matrix, extracting a first column vector corresponding to a number of a column in which the first position is present from the input multiplier matrix, and multiplying the first row vector with the first column vector to obtain the constraint maximum value, and/or the constraint minimum value may be determined by: determining a second position where the element minimum value in the matrix to be restored is present, extracting a second row vector corresponding to a number of a row in which the second position is present from the input multiplicand matrix, extracting a second column vector corresponding to a number of a column in which the second position is present from the input multiplier matrix, and multiplying the second row vector and the second column vector to obtain the constraint minimum value.

The determining of the multiplication result of the input multiplicand matrix and the input multiplier matrix may include: determining a position of the matrix restoration constraint value in a restoration matrix based on a position where a certain reference value is present in the matrix to be restored; and restoring other elements excluding the position where the certain reference value in the matrix to be restored is present, based on the matrix restoration constraint value, to obtain the restoration matrix, and determining the restoration matrix as the multiplication result of the input multiplicand matrix and the input multiplier matrix.

The position of the matrix restoration constraint value in the restoration matrix may be the same as the position of the certain reference value in the matrix to be restored.

The matrix restoration constraint value may include a constraint maximum value and a constraint minimum value, and the certain reference value may include an element maximum value and an element minimum value. The restoring of the other elements excluding the position where the certain reference value in the matrix to be restored is present may include: determining the constraint maximum value as a restoration element maximum value of the restoration matrix, and determining a position of the element maximum value in the matrix to be restored as a position of the constraint maximum value in the restoration matrix; determining the constraint minimum value as a restoration element minimum value of the restoration matrix, and determining a position of the element minimum value in the matrix to be restored as a position of the constraint minimum value in the restoration matrix; and restoring the other elements based on the restoration element maximum value, the restoration element minimum value, the constraint maximum value, and the constraint minimum value to obtain the restoration matrix.

The restoring of the other elements in the matrix to be restored may be performed by: in response to an element value of an element among the other elements being a positive number, computing a product of the element value of the element among the other elements and the restoration element maximum value, computing a ratio of the product and the element maximum value, and determining the computed ratio as an element value of the element among the other elements after restoration; in response to the element value of the element among the other elements being a negative number, computing a product of the element value of the element among the other elements and the restoration element minimum value, computing a ratio of the product and the element minimum value, and determining the computed ratio as the element value of the element among the other elements after restoration; and in response to the element value of the element among the other elements being zero, determining the element value of the element among the other elements after restoration as zero.

The input multiplicand matrix and the input multiplier matrix may each include a float matrix, and the first multiplication matrix and the second multiplication matrix may each include an integer matrix.

A non-transitory computer-readable storage medium may store instructions that, when executed by a processor, cause the processor to perform the processor-implemented method described above.

In another general aspect, a processing device includes one or more processors configured to: determine a first multiplication matrix and a second multiplication matrix, based on an input multiplicand matrix and an input multiplier matrix that are generated from a signal; determine a matrix to be restored, based on the first multiplication matrix and the second multiplication matrix; determine a matrix restoration constraint value, based on the matrix to be restored; determine a multiplication result of the input multiplicand matrix and the input multiplier matrix, based on the matrix restoration constraint value and the matrix to be restored; and analyze the input signal based on the multiplication result of the input multiplicand matrix and the input multiplier matrix.

The one or more processors may include: a quantization module configured to determine the first multiplication matrix and the second multiplication matrix, based on the input multiplicand matrix and the input multiplier matrix; a matrix operation module configured to determine the matrix to be restored, based on the first multiplication matrix and the second multiplication matrix; a constraint value determining module configured to determine the matrix restoration constraint value, based on the matrix to be restored; and a matrix restoration module configured to determine the multiplication result of the input multiplicand matrix and the input multiplier matrix, based on the matrix restoration constraint value and the matrix to be restored.

The quantization module may be further configured to quantize elements of the input multiplicand matrix and the input multiplier matrix, based on a positive number interval of a multiplication matrix value range and a negative number interval of the multiplication matrix value range, to obtain the first multiplication matrix and the second multiplication matrix. A numerical range of the positive number interval may be asymmetric with a numerical range of the negative number interval.

The constraint value determination module may include: a position determination sub-module configured to determine a position where a certain reference value in the matrix to be restored is present; a vector extraction sub-module configured to extract a row vector and a column vector corresponding to the position where the certain reference value is present from the input multiplicand matrix and the input multiplier matrix, respectively; and a restoration constraint value sub-module configured to determine the matrix restoration constraint value by using the row vector and the column vector.

The matrix restoration constraint value may include a constraint maximum value and a constraint minimum value, and the certain reference value may include an element maximum value and an element minimum value. The position determination sub-module may be further configured to determine a first position where the element maximum value in the matrix to be restored is present, extract a first row vector corresponding to a number of a row in which the first position is present from the input multiplicand matrix, and extract a first column vector corresponding to a number of a column in which the first position is present from the input multiplier matrix, and the restoration constraint value determination sub-module may be configured to multiply the first row vector with the first column vector to obtain the constraint maximum value. The position determination sub-module may be further configured to determine a second position where the element minimum value in the matrix to be restored is present, the vector extracting sub-module may be configured to extract a second row vector corresponding to a row number where the second position is present from the input multiplicand matrix and extract a second column vector corresponding to a column number where the second position is present from the input multiplier matrix, and the restoration constraint value determination sub-module may be configured to multiply the second row vector and the second column vector to obtain the constraint minimum value.

The matrix restoration module may be further configured to: determine a position of the matrix restoration constraint value in a restoration matrix based on a position where a certain reference value in the matrix to be restored is present; restore other elements excluding the position where the certain reference value in the matrix to be restored is present, based on the matrix restoration constraint value, to obtain the restoration matrix; and determine the restoration matrix as the multiplication result of the input multiplicand matrix and the input multiplier matrix.

The position of the matrix restoration constraint value in the restoration matrix may be the same as the position of the certain reference value in the matrix to be restored.

The matrix restoration constraint value may include a constraint maximum value and a constraint minimum value, and the certain reference value may include an element maximum value and an element minimum value. The matrix restoration module may be further configured to: determine the constraint maximum value as a restoration element maximum value of the restoration matrix; determine a position of the element maximum value in the matrix to be restored as a position of the constraint maximum value in the restoration matrix; determine the constraint minimum value as a restoration element minimum value of the restoration matrix; determine a position of the element minimum value in the matrix to be restored as a position of the constraint minimum value in the restoration matrix; and restore the other elements based on the restoration element maximum value, the restoration element minimum value, the constraint maximum value, and the constraint minimum value to obtain the restoration matrix.

The matrix restoration module may be further configured to restore the elements in the matrix to be restored by: in response to an element value of an element among the other elements being a positive number, computing a product of the element value of the element among the other elements and the restoration element maximum value, computing a ratio of the product and the element maximum value, and determining the computed ratio as an element value of the element among the other elements after restoration; in response to the element value of the element among the other elements being a negative number, computing a product of the element value of the element among the other elements and the restoration element minimum value, computing a ratio of the product and the element minimum value, and determining the computed ratio as the element value of the element among the other elements after restoration; and in response to the element value of the element among the other elements being zero, determining the element value of the element among the other elements after restoration as zero.

In another general aspect, a computing device includes a processor and a memory storing a computer program. The computing device may be configured to, in response to the computer program being executed by the processor: determine a first multiplication matrix and a second multiplication matrix, based on an input multiplicand matrix and an input multiplier matrix that are generated from an input signal; determine a matrix to be restored, based on the first multiplication matrix and the second multiplication matrix; determine a matrix restoration constraint value, based on the matrix to be restored; determine a multiplication result of the input multiplicand matrix and the input multiplier matrix, based on the matrix restoration constraint value and the matrix to be restored; and analyze the input signal based on the multiplication result.

Other features and aspects will be apparent from the following detailed description, the drawings, and the claims.

BRIEF DESCRIPTION OF THE DRAWINGS

FIG. 1 is a schematic diagram of a general matrix multiplication according to related art.

FIG. 2 is a flowchart of a matrix multiplication computation method, according to an embodiment.

FIG. 10 is a schematic diagram for obtaining a matrix to be restored, according to an embodiment.

FIG. 11 is a schematic diagram illustrating obtaining a restoration matrix by restoring the matrix to be restored shown in FIG. 10, according to an embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 3:
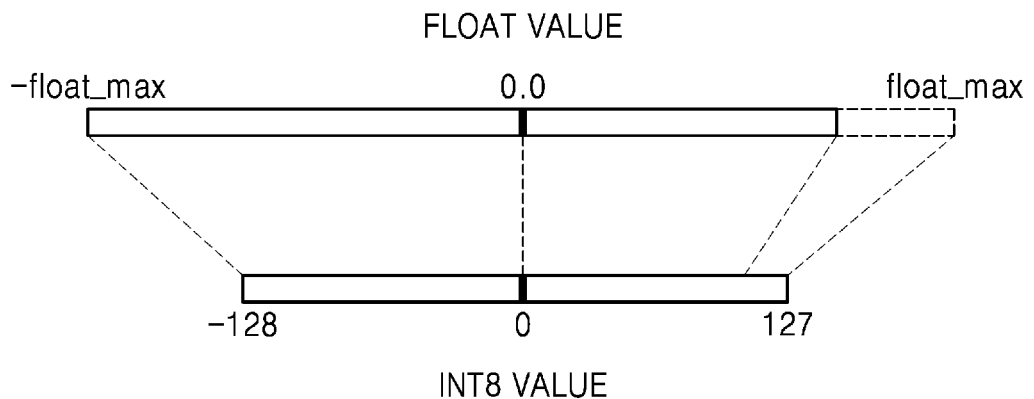
FIG. 3 is a schematic diagram of a quantization process, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 2 is a flowchart of a matrix multiplication computation method, according to an embodiment.

Referring to FIG. 2, in operation S10, a first multiplication matrix and a second multiplication matrix are determined according to an input multiplicand matrix and an input multiplier matrix.

The input multiplicand matrix and the input multiplier matrix may be generated according to signals. The signals may be any of various signals required when performing a matrix multiplication operation. For example, the signals may include, but are not limited to, image signals, handwriting input signals, speech recognition input signals, and the like.

That is, the matrix multiplication computation method may be used in analysis and identification processes of various signals. For example, upon analyzing and recognizing a signal by using a neural network, the matrix multiplication computation method disclosed herein may be applied to a matrix multiplication operation of the neural network.

In an embodiment, a device with matrix multiplication computation (e.g., a matrix multiplication computation device) may determine the first multiplication matrix and the second multiplication matrix by determining the maximum value of absolute values in all elements of the input multiplicand matrix and the input multiplier matrix, and quantizing each element of the input multiplicand matrix and the input multiplier matrix, based on the determined maximum value of the absolute values to obtain the first multiplication matrix and the second multiplication matrix. For example, the matrix multiplication computation device may obtain the first multiplication matrix by quantizing each element in the input multiplicand matrix, and obtain the second multiplication matrix by quantizing each element in the input multiplier matrix.

In an embodiment, the input multiplicand matrix and the input multiplier matrix may include, but are not limited to, a floating matrix (hereinafter referred to as a "float matrix"), where a data type of each element in the float matrix is a float data type. In an embodiment, the first multiplication matrix and the second multiplication matrix may include, but are not limited to, an integer matrix (hereinafter referred to as "int8 matrix"), where a data type of each element in the integer matrix is an integer data type. That is, the matrix multiplication computation device quantizes float type data into int8 type data in operation S10.

For example, element values of each element in the input multiplicand matrix and the input multiplier matrix may include, but are not limited to, a positive number, a negative number, and zero. That is, the matrix multiplication computation method disclosed herein may handle a case in which element values include all of the positive number, the negative number, and zero in the float matrix.

FIG. 3 is a schematic diagram of a quantization process, according to an embodiment.

In an embodiment, a symmetric quantization method is employed for the quantization process of an input multiplicand matrix and an input multiplier matrix. During the quantization process, zero remains unchanged, and a matrix multiplication computation device quantizes each of element values in a float matrix located in a positive number interval and a negative number interval.

That is, the matrix multiplication computation device quantizes all elements of the input multiplicand matrix and the input multiplier matrix, based on a positive number interval of a multiplication matrix value interval and a negative number interval of the multiplication matrix value interval to obtain a first multiplication matrix and a second multiplication matrix.

As shown in FIG. 3, −float_max denotes the maximum negative value of the element value in the float matrix, float_max denotes the maximum positive value of the element value in the float matrix, and because a range of int8 type data is [−128,127], the positive number interval of a multiplication matrix value range is (0,127], the negative number interval of the multiplication matrix value range is [−128,0), and the negative number of the int8 type data after quantization indicates a greater region. Here, the numerical range of the positive number interval is asymmetric with the numerical range of the negative number interval, and a quantization precision is improved in the negative number interval by adding a quantization value to the positive number interval.

When an element value of any element of the input multiplicand matrix and the input multiplier matrix is a positive number, a specific quantization process may quantize the element having the element value that is a positive number, based on the positive number interval of the multiplication matrix value range and the determined maximum value of the absolute value in all elements of the input multiplicand matrix and the input multiplier matrix.

In this case, the matrix multiplication computation device may quantize any element having the element value is the positive number (hereinafter referred to as a "positive element") by computing a ratio of the element value of the positive element to the maximum value of the determined absolute value, computing the product of the ratio and the upper limit value of the positive number interval, and determining the obtained product as the element value of the positive element after quantization.

When the element value of any element of the input multiplier matrix and the input multiplier matrix is a negative number, the matrix multiplication computation device may quantize any element having the element value that is a negative number, based on the negative number interval of the multiplication matrix value range and the determined maximum value of the absolute values among all the elements of the input multiplier matrix and the input multiplier matrix.

In this case, the matrix multiplication computation device may quantize any element having the element value is the negative number (hereinafter referred to as a "negative element") by computing a ratio of the element value of the negative element to the maximum value of the determined absolute value, computing the product of the ratio and the lower limit value of the negative number interval, and determining the obtained product as the element value of the negative element after quantization.

When the element value of any element in the input multiplicand matrix and the input multiplier matrix is zero, the element value of any such element after quantization is still zero.

For example, the matrix multiplication computation device may quantize any element using the following Equation 1:

$$\text{int8\_value} = \begin{cases} \dfrac{\text{float\_value}}{\max} \times 127, & \text{float\_value} > 0 \\ \dfrac{\text{float\_value}}{\max} \times 128, & \text{float\_value} < 0 \\ 0, & \text{float\_value} = 0 \end{cases} \quad [\text{Equation 1}]$$

in Equation 1, float_value denotes the element value of any element in the float matrix, max denotes the maximum value of the absolute values in all the elements of the input multiplicand matrix and the input multiplier matrix, and int8_value denotes the element value of any element after quantization in the int8 matrix.

In the quantization process, the matrix multiplication computation device needs to compute the maximum value of the absolute values of all the elements of the input float matrix, and simultaneously needs to quantize each element according to the maximum value of the absolute values. A time complexity of the quantization process is $O(n^2)$, where n denotes a matrix dimension.

Referring back to FIG. 2, in operation S20, the matrix multiplication computation device determines a matrix to be restored according to the determined first multiplication matrix and second multiplication matrix.

For example, the first multiplication matrix may be multiplied by the second multiplication matrix, and a multiplication result may be determined as the matrix to be restored. As an example, the matrix multiplication computation device may use a general matrix multiplication (GEMM) to perform a matrix multiplication operation on the first multiplication matrix and the second multiplication matrix.

Because the first multiplication matrix and the second multiplication matrix are both int8 matrices, the above-described matrix multiplication method is a multiplication of two int8 matrices, that is, a matrix multiplication operation may be performed on equipment supporting int8 type data. The time complexity of the matrix multiplication operation is $O(n^3)$.

In operation S30, the matrix multiplication computation device may determine a matrix restoration constraint value according to the determined matrix to be restored.

The matrix restoration constraint value may be a constraint value for inverse quantizing the matrix to be restored. An example process of determining the matrix restoration constraint value according to the matrix to be restored is described below with reference to FIG. 4.

Figure 4:
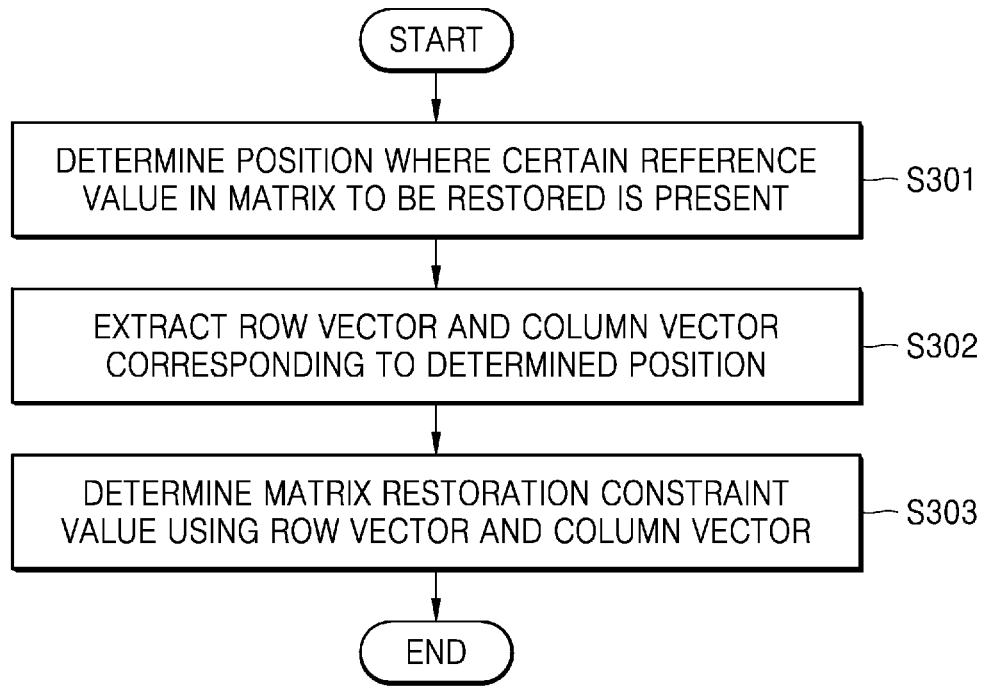
FIG. 4 is a flowchart of an operation of determining a matrix restoration constraint value, according to an embodiment.

FIG. 4 is a flowchart of an operation of determining a matrix restoration constraint value. according to an embodiment.

Referring to FIG. 4, in operation S301, a matrix multiplication computation device determines a position where a certain reference value in a matrix to be restored is present. Here, the certain reference value may be an element value of an element designated in advance in the matrix to be restored.

In operation S302, according to the position where the certain reference value is present, the matrix multiplication computation device extracts a row vector and a column vector corresponding to the position of the certain reference value in the matrix to be restored from each of an input multiplicand matrix and an input multiplier matrix.

For example, the matrix multiplication computation device extracts the row vector corresponding to a number of a column of the position where the certain reference value is present from the input multiplicand matrix and extracts the column vector corresponding to a number of a column of the position where the certain reference value is present from the input multiplier matrix.

In operation S303, the matrix multiplication computation device determines the matrix restoration constraint value using the extracted row vector and column vector.

For example, the matrix multiplication computation device multiplies the extracted row vector by the column vector, and determines a multiplication result as the matrix restoration constraint value.

In an embodiment, the matrix restoration constraint value may include a constraint maximum value and a constraint minimum value, and the certain reference value may include an element maximum value and an element minimum value. Here, the element maximum value may refer to a maximum value among the element values of all the elements in the matrix to be restored, and the element minimum value may refer to a minimum value among the element values of all the elements in the matrix to be restored.

As an example, a position of the constraint maximum value in the restoration matrix coincides with a position of the element maximum value in the matrix to be restored, and a position of the constraint minimum value in the restoration matrix coincides with a position of the element minimum value in the matrix to be restored.

Figure 5:
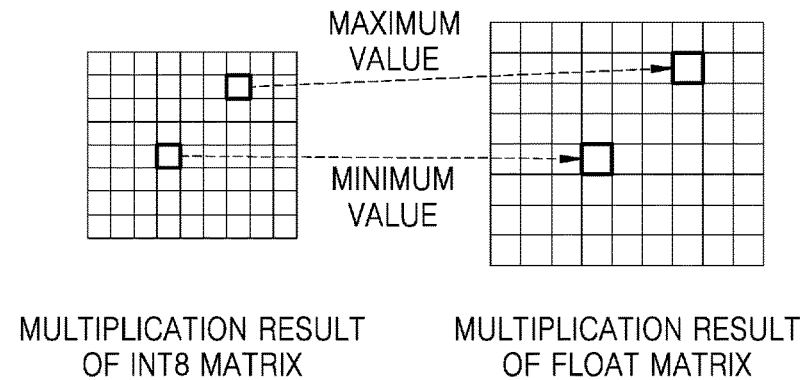
FIG. 5 is a schematic diagram for determining positions of a constraint maximum value and a constraint minimum value in a restoration matrix, according to an embodiment.

FIG. 5 is a schematic diagram of determining positions of a constraint maximum value and a constraint minimum value in a restoration matrix, according to an embodiment.

As shown in FIG. 5, in a process of multiplying a first multiplication matrix by a second multiplication matrix and obtaining a matrix to be restored, a matrix multiplication computation device may record positions where an element maximum value and an element minimum value are present in the matrix to be restored.

In an embodiment, it may be seen that by analyzing a multiplication result of the int8 matrix (i.e., the matrix to be restored) and a multiplication result of the float matrix (i.e., the restoration matrix), the multiplication result of two types of matrices exhibits a proportional relationship, as shown in the following Equation 2:

$$r_{ij} = \frac{127 \times 128}{\max_1 \times \max_2} \times fr_{ij} \qquad \text{[Equation 2]}$$

In Equation 2, $r_{ij}$ denotes element values of elements in an i-th row and j-th column in the multiplication result of the int8 matrix, $fr_{ij}$ denotes element values of elements in an i-th row and j-th column in the multiplication result of the float matrix, $\max_1$ denotes a maximum value of absolute values of all elements in the input multiplicand matrix, $\max_2$ denotes a maximum value of absolute values of all elements in the input multiplier matrix, 127 is the upper limit value of an int8 type data value range, and 128 is the lower limit value of the int8 type data value range.

Based on the element value proportional relationship exhibited by the multiplication results of the two types of matrices, it may be seen that the position where the maximum value in the multiplication result of the int8 matrix is present coincides with the position where the maximum value in the multiplication result of the float matrix is present, and the position where the minimum value in the multiplication result of the int8 matrix is present coincides with the position where the minimum value in the multiplication result of the float matrix is present.

It should be understood that, in the above embodiment, the position of the matrix restoration constraint value in the restoration matrix is determined on the premise that the position of the matrix restoration constraint value in the restoration matrix is the same as the position of the certain reference value in the matrix to be restored. It should be understood that there may be cases where the two positions do not coincide, but even if the two positions do not coincide, the two positions are relatively close, and therefore the above-described method of determining the position of the matrix restoration constraint value in the restoration matrix is accurate.

Here, the reason why the position determination is deviated is that a numerical range of a negative number interval of the value range of int8 type data is larger than a numerical range of a positive number interval. However, the advantage obtained by increasing a quantization value in the negative number interval is larger than a negative influence of the position deviation, and thus the computation accuracy of the matrix multiplication computation method may be ensured not to be affected, and the computation error may be reduced while the speed of matrix multiplication increases.

An example operation of determining a constraint maximum value and a constraint minimum value is described below with reference to FIGS. 6 and 7, respectively. Here, the time complexity of determining the constraint maximum value and the constraint minimum value is $O(n^2)$.

Figure 6:
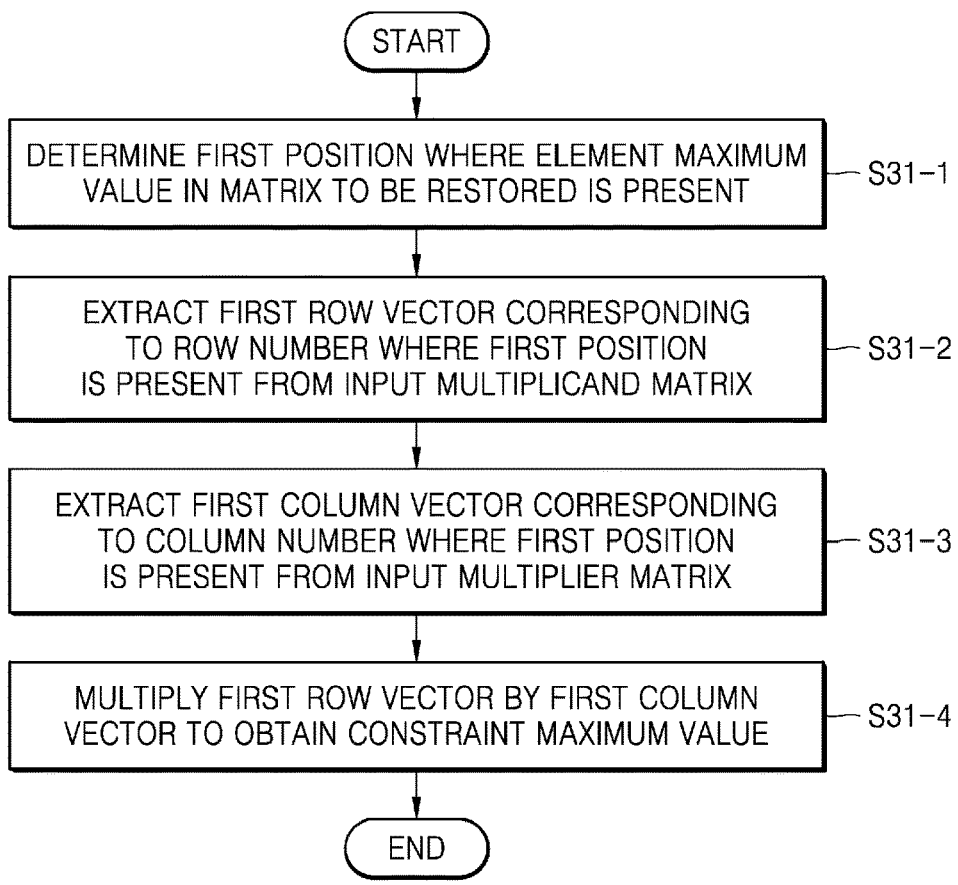
FIG. 6 is a flowchart of an operation of determining a constraint maximum value, according to an embodiment.

FIG. 6 is a flowchart of an operation of determining a constraint maximum value, according to an embodiment.

Referring to FIG. 6, in operation S31-1, a matrix multiplication computation device determines a first position where an element maximum value in a matrix to be restored is present.

In operation S31-2, the matrix multiplication computation device extracts a first row vector corresponding to a number of a column in which the first position is present from an input multiplicand matrix.

In operation S31-3, the matrix multiplication computation device extracts a first column vector corresponding to a number of a column in which the first position is present from an input multiplier matrix.

In operation S31-4, the matrix multiplication computation device multiplies the extracted first row vector by the extracted first column vector to obtain the constraint maximum value.

An example operation, performed by the matrix multiplication computation device, of determining the constraint minimum value is described below with reference to FIGS. 7 and 8.

Figure 7:
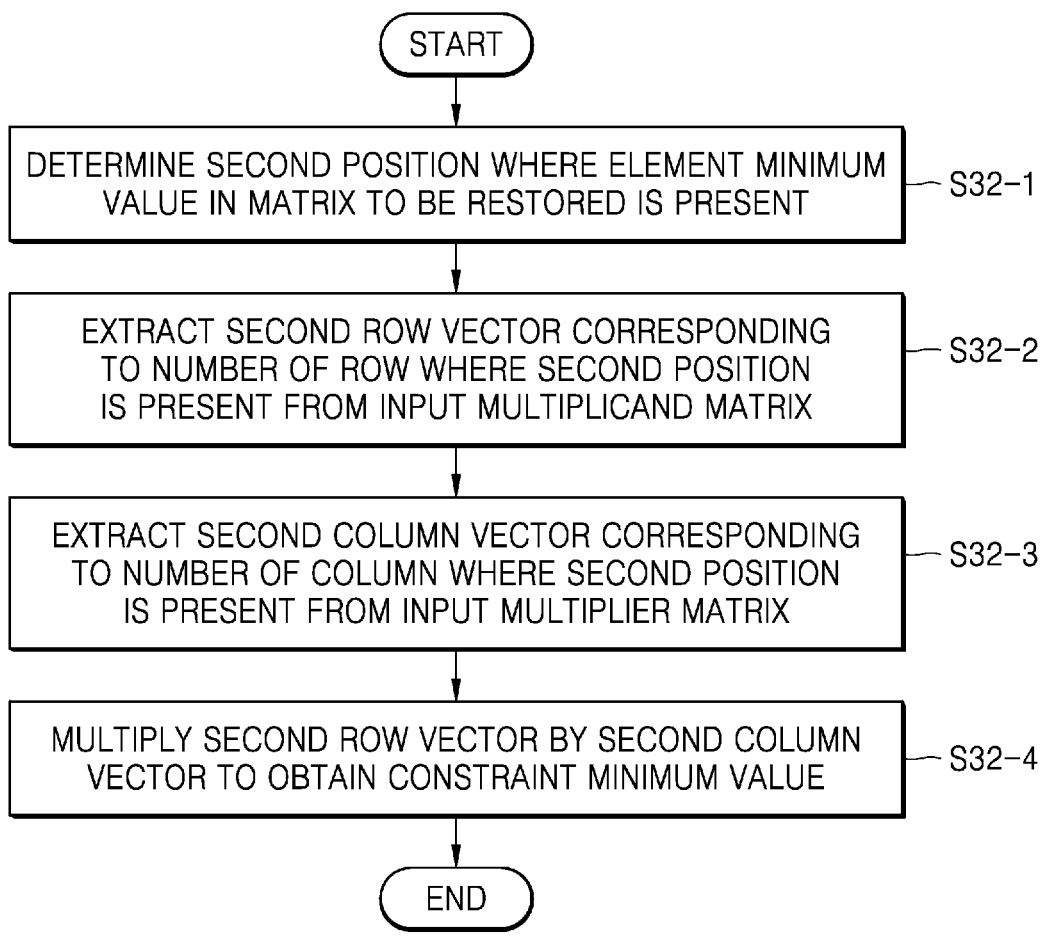
FIG. 7 is a flowchart of an operation of determining a constraint minimum value, according to an embodiment.

FIG. 7 is a flowchart of an operation of determining a constraint minimum value according to an embodiment of the present disclosure.

Referring to FIG. 7, in operation S32-1, a matrix multiplication computation device determines a second position at which an element minimum value in a matrix to be restored is present.

In operation S32-2, the matrix multiplication computation device extracts a second row vector corresponding to a number of a row in which the second position is present from an input multiplicand matrix.

In operation S32-3, the matrix multiplication computation device extracts a second column vector corresponding to a number of a column in which the second position is present from an input multiplier matrix.

Figure 8:
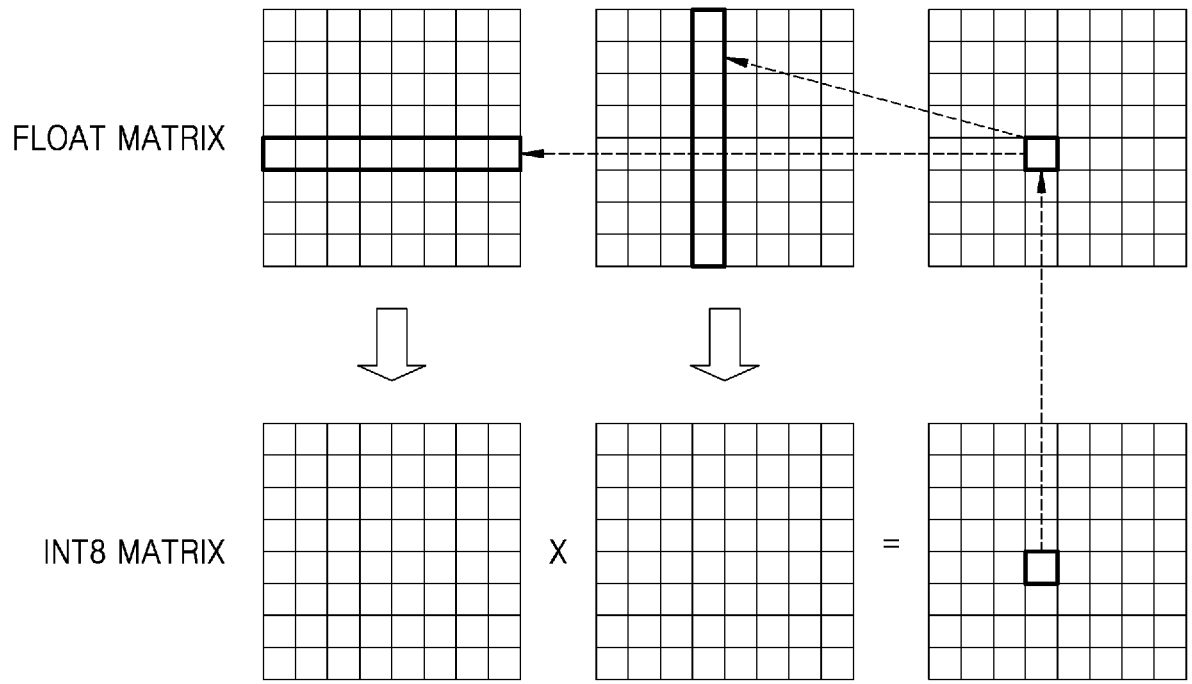
FIG. 8 is a schematic diagram for determining a constraint minimum value, according to an embodiment.

Taking the example shown in FIG. 8, when the element maximum value in a multiplication result of the int8 matrix is located at a fifth row and a fourth column, the matrix multiplication computation device extracts a row vector of the fifth row from the input multiplicand matrix and a column vector of the fourth column from the input multiplier matrix accordingly.

In operation S32-4, the matrix multiplication computation device may multiply the extracted second row vector by the extracted second column vector to obtain the constraint minimum value.

For example, the matrix multiplication computation device may obtain the constraint minimum value by performing a vector inner product on the second row vector and the second column vector.

In the matrix multiplication computation method disclosed herein, the constraint maximum value and the constraint minimum value used for restoration (inverse quantization) are obtained by a float matrix computation. The constraint maximum value and the constraint minimum value both change every time matrix multiplication is performed, and are not fixed values, and thus a computation error caused by fixing a maximum value and a minimum value in the quantization matrix multiplication according to the related art may be effectively reduced.

Referring back to FIG. 2, in operation S40, the matrix multiplication computation device determines a multiplication result of the input multiplicand matrix and the input multiplier matrix according to the determined matrix restoration constraint value and the matrix to be restored.

For example, the matrix multiplication computation device may determine the position of the matrix restoration constraint value in the restoration matrix according to the position where the certain reference value in the matrix to be restored is present, restore other elements except the position where the certain reference value in the matrix to be restored is present according to the matrix restoration constraint value to obtain the restoration matrix, and determine the obtained restoration matrix as the multiplication result of the input multiplicand matrix and the input multiplier matrix. In an embodiment, the position of the matrix restoration constraint value in the restoration matrix is the same as the position of the certain reference value in the restoration matrix.

When the matrix restoration constraint value includes the constraint maximum value and the constraint minimum value, and the certain reference value includes the element maximum value and the element minimum value, based on the proportional relationship of element values presented by the multiplication result of the two types of matrices, the positions of the constraint maximum value and the constraint minimum value in the restoration matrix may be deduced in reverse according to the positions of the element maximum value and the element minimum value in the matrix to be restored.

A process of determining the restoration matrix is described below with reference to FIG. 9.

Figure 9:
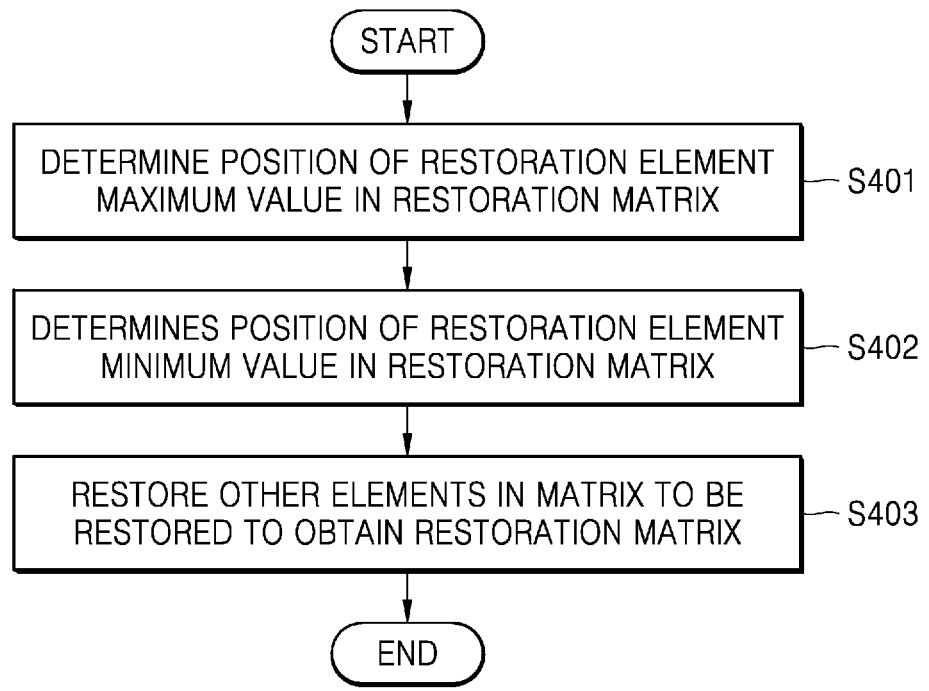
FIG. 9 is a flowchart of an operation of determining a restoration matrix, according to an embodiment.

FIG. 9 is a flowchart of an operation of determining a restoration matrix according to an embodiment of the present disclosure.

Referring to FIG. 9, in operation S401, a matrix multiplication computation device determines a position of a restoration element maximum value in the restoration matrix.

Here, the restoration element maximum value may be a maximum value among element values of all elements in the restoration matrix. For example, the matrix multiplication computation device may determine the element maximum value as the restoration element maximum value of the restoration matrix, and determine the position of the element maximum value in the matrix to be restored as the position of the restoration element maximum value in the restoration matrix.

That is, the position where the maximum value is located in the element values of all the elements in the restoration matrix is the same as the position where the maximum value is located in the element values of all the elements in the matrix to be restored.

In operation S402, the matrix multiplication computation device determines a position of a restoration element minimum value in the restoration matrix.

Here, the restoration element minimum value may be a minimum value among element values of all elements in the restoration matrix. For example, the matrix multiplication computation device may determine the constraint minimum value as the restoration element minimum value of the restoration matrix, and determine the position of the element minimum value in the matrix to be restored as the position of the restoration element minimum value in the restoration matrix.

That is, the position where the minimum value is located in the element values of all the elements in the restoration matrix is the same as the position where the minimum value is located in the element values of all the elements in the matrix to be restored.

In operation S403, the matrix multiplication computation device restores other elements in the matrix to be restored excluding the position where the certain reference value is present according to the restoration element maximum value, the restoration element minimum value, the constraint maximum value, and the constraint minimum value to obtain the restoration matrix.

For example, when an element value of any other element is a positive number, the matrix multiplication computation device computes the product of the element value of the any other element and the restoration element maximum value, computes the ratio of the computed product and the element maximum value, and determines the computed ratio as an element value of the any other element after restoration.

When the element value of any other element is a negative number, the matrix multiplication computation device computes the product of the element value of the any other element and the restoration element minimum value, computes the ratio of the product and the element minimum value, and determines the computed ratio as the element value of the any other element after restoration.

When the element value of any other element is zero, the element value of any other such element after restoration is still zero.

For example, the matrix multiplication computation device may determine the element value of the any other element after restoration using the following Equation 3:

$$\text{float\_result} = \begin{cases} \dfrac{\text{int8\_result} \times f\max}{r\max} \times \text{int8\_result} > 0 \\ \dfrac{\text{int8\_result} \times f\min}{r\min} \times \text{int8\_result} < 0 \\ 0, \text{int8\_result} = 0 \end{cases} \quad \text{[Equation 3]}$$

In Equation 3, int8_result denotes the element value of any other element in the matrix to be restored excluding the position where the certain reference value is present, float_result denotes the element value of any other element after restoration, fmax denotes the restoration element maximum value, fmin denotes the restoration element minimum value, rmax denotes the element maximum value in the matrix to be restored, and rmin denotes the element minimum value in the matrix to be restored.

Here, the time complexity computed by inverse quantizing each element in the matrix to be restored is $O(n^2)$.

An example computation process of the matrix multiplication computation method disclosed herein, including two matrix multiplication computation processes of 3×3 matrices, is described below with reference to FIGS. 10 and 11.

FIG. 10 is a schematic diagram of obtaining a matrix to be restored, according to an embodiment. FIG. 11 is a schematic diagram illustrating obtaining a restoration matrix by restoring the matrix to be restored shown in FIG. 10, according to an embodiment.

As shown in FIG. 10, an input multiplicand matrix and an input multiplier matrix are a float matrix A and a float matrix B, respectively. A matrix multiplication computation device obtains an int8 matrix A by quantizing each element in the float matrix A, obtain an int8 matrix B by quantizing each element in the float matrix B, and obtains a matrix to be restored by performing a matrix multiplication operation on the int8 matrix A and the int8 matrix B.

Because the position where the element minimum value in the matrix to be restored is present is a third row and a second column, the matrix multiplication computation device extracts corresponding row vectors and column vectors from the float matrix A and the float matrix B, respectively. For example, the matrix multiplication computation device may perform inner products, for example, (0.3, −0.3, −0.5)·(0.1,0.2,−0.7)=−0.41, to obtain the restoration element minimum value (the constraint minimum value), and obtain 0.62 that is the restoration element maximum value (the constraint maximum value) in a similar computation manner as described above.

As shown in FIG. 11, the matrix multiplication computation device inverse quantizes other elements excluding the positions where the positions of the element maximum value and the element minimum value in the matrix to be restored are present according to the constraint maximum value and the constraint minimum value obtained by the above computation. The restoration element maximum value and the restoration element minimum value in the restored matrix after inverse quantization are accurate, and the other elements are inverse quantized depending on the constraint maximum value and the constraint minimum value. The element values after inverse quantization are rounded to reserve two digits after the decimal point, and the multiplication result obtained by the matrix multiplication computation method disclosed herein is consistent with the result of directly performing matrix multiplication on two float matrices.

Taking mNist handwritten digit recognition in tensorflow as an example, assuming input trajectory analysis based on a recurrent neural network (RNN), the comparison of recognition accuracy and execution speed of the RNN according to the related art and the RNN using the matrix multiplication computation method disclosed herein is shown in Table 1:

TABLE 1

| Applications | tensorflow mnist RNN | mNist RNN of this disclosure |
| --- | --- | --- |
| Recognition Accuracy | 98.03% | 98.02% |
| Execution Time | 96.888 s | 34.971 s |

Taking Deep Speech v1 that is the deep speech recognition system according to the related art as an example, the comparison between a word error rate (WER) of Deep Speech v1 according to the related art and Deep Speech v1 using the matrix multiplication computation method disclosed herein is shown in Table 2:

TABLE 2

| Applications | Deep Speech v1 | Deep Speech v1 of this disclosure |
| --- | --- | --- |
| WER on Tensorflow life | 10.87% | 12.33% |
| WER on Tensorflow life | 10.88% | 11.65% |

With regard to matrices of different dimensions, the comparison of execution time between GEMM and matrix multiplication using the matrix multiplication computation method disclosed herein is shown in Table 3:

TABLE 3

| Matrix Dimension | GEMM | Matrix multiplication of the present disclosure |
| --- | --- | --- |
| [100 × 100] × [100 × 100] | 2.528 ms | 1.358 ms |
| [1000 × 1000] × [1000 × 1000] | 1241.372 ms | 243.300 ms |
| [10000 × 10000] × [10000 × 10000] | 1155.98 s | 211.867 s |

Figure 12:
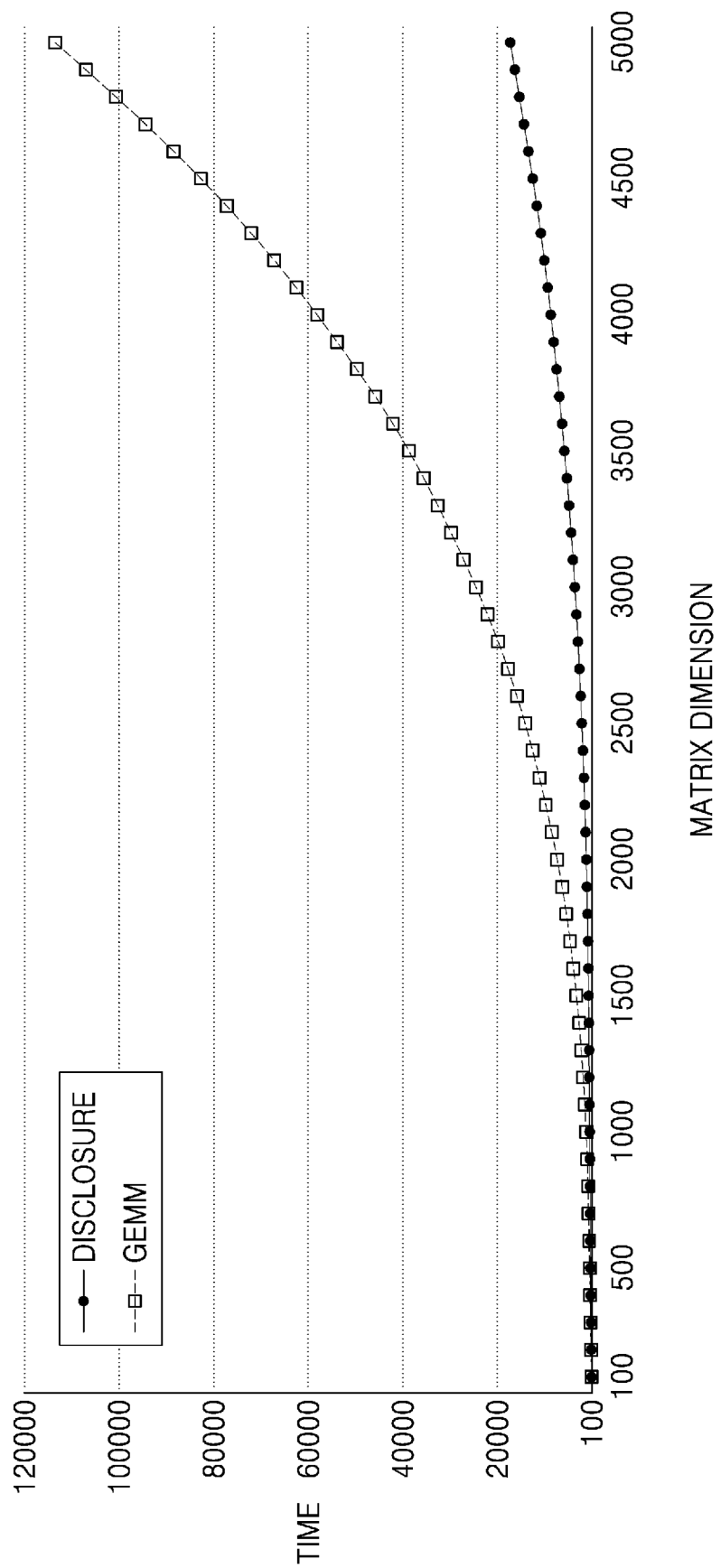
FIG. 12 is a schematic diagram for comparing a matrix multiplication runtime of a matrix multiplication computation method, according to an embodiment, with a general matrix multiplication runtime according to related art.

FIG. 12 is a schematic diagram of a comparison of a matrix multiplication runtime of a matrix multiplication computation method according to an embodiment disclosed herein with a general matrix multiplication execution time according to the related art.

It may be seen from FIG. 12 that as the matrix dimension increases, the matrix multiplication execution time may be effectively reduced by using the matrix multiplication computation method disclosed herein, compared with the general matrix multiplication.

Taking figure recognition as an example, assuming that an input image is processed based on a convolutional neural network (CNN), the comparison between image recognition accuracy of the exiting CNN (see the corresponding page of Google) and image recognition accuracy of CNN using the matrix multiplication computation method disclosed herein (see the corresponding page of SRCX) is shown in Table 4.

TABLE 4

| | Google | | | | SRCX | | Google | |
| --- | --- | --- | --- | --- | --- | --- | --- | --- |
| | Model(int8) | TOP-1 | TOP-5 | Model (FP32) | TOP-1 | TOP-5 | TOP-1 | TOP-5 |
| CNN | Inception_V3_quant | 77.6% | 93.7% | CNN Inception_V3 | 77.3% | 93.5% | 77.9% | 93.8% |
| | Inception_V4_quant | 79.5% | 93.9% | Inception_V4 | 78.8% | 94.1% | 80.1% | 95.1% |
| | N/A | | | ResNetNet_V2_101 | 76.1% | 93.1% | 76.8% | 93.6% |

TABLE 4-continued

| Model(int8) | Google | | Model (FP32) | SRCX | | Google | |
|---|---|---|---|---|---|---|---|
| | TOP-1 | TOP-5 | | TOP-1 | TOP-5 | TOP-1 | TOP-5 |
| N/A | | | Inception_ResNet_V2 | 77.0% | 93.7% | 77.5% | 94.0% |
| N/A | | | NASNet_mobile | 73.1% | 91.1% | 73.9% | 91.5% |

In the quantization and inverse quantization processes described herein, because the time complexity of the quantization process is $O(n^2)$ and the time complexity of the matrix multiplication operation is $O(n^3)$, the time complexity of the inverse quantization process is $O(n^2)$. Because $O(n^2)+O(n^3)+O(n^2)=O(n^3)$, and the most complex time complexity in each process is determined as the final time complexity, the time complexity of a float matrix multiplication is $O(n^3)$. Therefore, the matrix multiplication process based on quantization and inverse quantization of the disclosure herein does not increase the time complexity of matrix multiplication, and the performance is improved by replacing float matrix multiplication by int8 matrix multiplication. However, the disclosure is not limited to this example. The time complexity may be determined in various ways.

In the matrix multiplication computation method of an embodiment of this disclosure, a method of quantizing positive and negative number intervals respectively is used in the process of quantizing the input float matrix, and every data in the int8 data type is fully utilized.

In addition, the matrix multiplication computation method of an embodiment of this disclosure performs a matrix multiplication operation on the int8 matrix, and may be executed on a device supporting an int8 matrix operation.

In addition, after an int8 matrix multiplication computation is finished, the positions where the restoration element maximum value and the restoration element minimum value in a float multiplication result are present may be deduced from the positions where the element maximum value and the element minimum value in an int8 matrix multiplication result are present, and accurate restoration element maximum value and restoration element minimum value may be computed according to the positions where the element maximum value and the element minimum value in int8 multiplication result are present.

In addition, with respect to the computed accurate maximum constraint value and minimum constraint value, other elements in the int8 multiplication result are restored, and thus the error after restoration may be relatively reduced, and the accuracy of inverse quantization may be improved.

Figure 13:
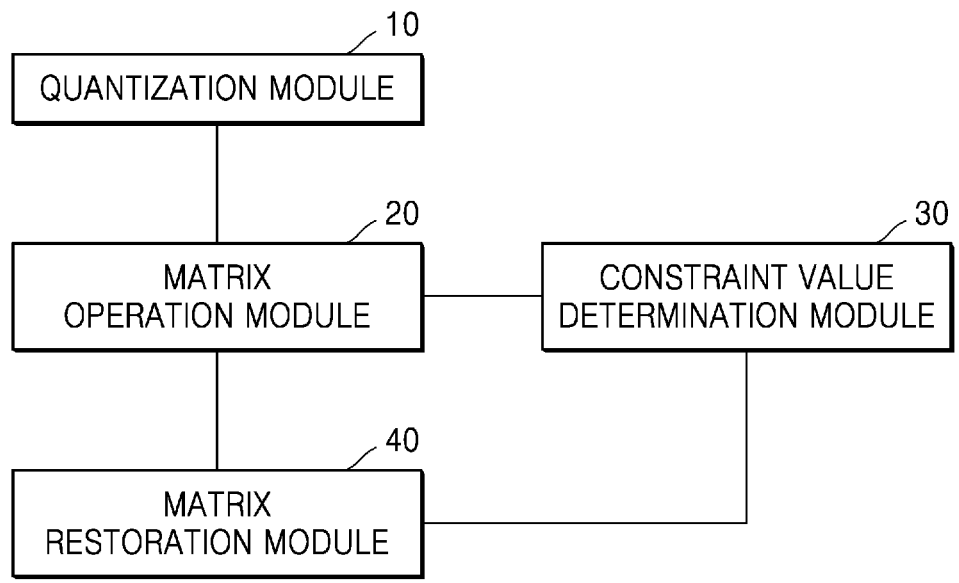
FIG. 13 is a block diagram of a computation device with matrix multiplication, according to an embodiment.

FIG. 13 is a block diagram of a matrix multiplication computation device, according to an embodiment.

As shown in FIG. 13, the matrix multiplication computation device may include, for example, a quantization module (or, quantizer) 10, a matrix operation module (or, matrix operator) 20, a constraint value determination module (or, constraint value determiner) 30, and a matrix restoration module (or matrix restorer) 40.

For example, the quantization module 10 determines a first multiplication matrix and a second multiplication matrix, based on an input multiplicand matrix and an input multiplier matrix.

As an example, the input multiplicand matrix and the input multiplier matrix may include, but are not limited to, float matrices, and the first multiplication matrix and the second multiplication matrix may include, but are not limited to, integer matrices.

For example, the quantization module 10 may determine a maximum value of absolute values in all elements of the input multiplicand matrix and the input multiplier matrix, quantize all the elements of the input multiplicand matrix and the input multiplier matrix, based on the determined maximum value of absolute values, and obtain the first multiplication matrix and the second multiplication matrix.

As an example, an element value of an element in the input multiplicand matrix and the input multiplier matrix may be, but is not limited to, any one among a positive number, a negative number, and zero.

For example, the quantization module 10 may quantize all the elements of the input multiplicand matrix and the input multiplier matrix, based on positive and negative number intervals of a multiplication matrix value range to obtain the first multiplication matrix and the second multiplication matrix. A numerical range of the positive number interval may be asymmetric with a numerical range of the negative number interval.

In an embodiment, the quantization module 10 may quantize any element of the input multiplier matrix and the input multiplicand matrix in the following manner.

When an element value of any element is a positive number, the quantization module 10 may quantize the element having the positive number as an element value, based on the positive number interval of the multiplication matrix value range and the determined maximum value of the absolute values.

For example, the quantization module 10 may quantize any element having the element value that is the positive number (hereinafter referred to as a "positive element") by computing a ratio of the element value of the positive element to the maximum value of the determined absolute value, computing the product of the ratio and the upper limit value of the positive number interval, and determining the computed product as the element value of the positive element after quantization.

When the element value of any element is a negative number, the quantization module 10 may quantize the element having the negative number as an element value, based on the negative number interval of the multiplication matrix value range and the determined maximum value of the absolute values.

For example, the quantization module 10 may quantize any element having the element value that is the negative number (hereinafter referred to as a "negative element") by computing a ratio of the element value of the negative element to the maximum value of the determined absolute value, compute the product of the ratio and the lower limit value of the negative number interval, and determine the computed product as the element value of the negative element after quantization.

When the element value of an element is zero, the element value of such an element after quantization is still zero.

The matrix operation module 20 determines a matrix to be restored according to the determined first multiplication matrix and second multiplication matrix.

For example, the matrix operation module 20 may multiply the first multiplication matrix by the second multiplication matrix, and determine a multiplication result as the matrix to be restored.

The constraint value determination module 30 may determine a matrix restoration constraint value according to the determined matrix to be restored.

Figure 14:
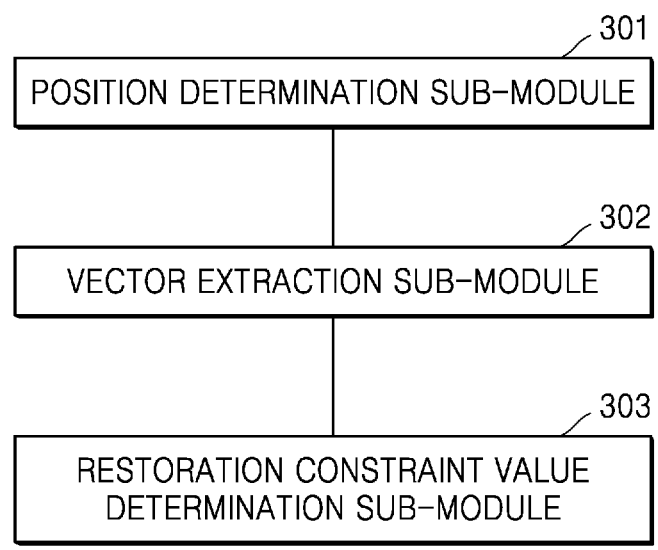
FIG. 14 is a block diagram of a constraint value determination module, according to an embodiment.

FIG. 14 is a block diagram of the constraint value determination module 30, according to an embodiment.

As shown in FIG. 14, the constraint value determination module 30 may include, for example, a position determination sub-module (or, position determiner) 301, a vector extraction sub-module (or, vector extractor) 302, and a restoration constraint value determination sub-module (or, restoration constraint value determiner) 303.

For example, the position determination sub-module 301 determines a position where a certain reference value in a matrix to be restored is present.

The vector extraction sub-module 302 extracts a row vector and a column vector corresponding to the position where the certain reference value is present from each of an input multiplicand matrix and an input multiplier matrix according to the position where the certain reference value is present.

The restoration constraint value determination sub-module 303 determines the matrix restoration constraint value using the extracted row vector and column vector.

In an embodiment, the matrix restoration constraint value may include a constraint maximum value and a constraint minimum value, and the certain reference value may include an element maximum value and an element minimum value.

For example, a process of determining the constraint maximum value may include the following operations: the position determination sub-module 301 determines a first position where an element maximum value in a matrix to be restored is present; the vector extraction sub-module 302 extracts a first row vector corresponding to a number of a row in which the first position is present from an input multiplicand matrix and extracts a first column vector corresponding to a number of a column in which the first position is present from an input multiplier matrix; and the restoration constraint value determination sub-module 303 multiplies the extracted first row vector by the first column vector to obtain the constraint maximum value.

For example, a process of determining the constraint minimum value may include operations: the position determination sub-module 301 determines a second position at which an element minimum value in a matrix to be restored is present; the vector extraction sub-module 302 extracts a second row vector corresponding to a number of a row in which the second position is present from an input multiplicand matrix and extracts a second column vector corresponding to a number of a column in which the second position is present from an input multiplier matrix; and the restoration constraint value determination sub-module 30 multiplies the extracted second row vector by the second column vector to obtain the constraint minimum value.

Referring back to FIG. 13, the matrix restoration module 40 determines a multiplication result of the input multiplicand matrix and the input multiplier matrix according to the determined matrix restoration constraint value and the matrix to be restored.

For example, the matrix restoration module 40 may determine the position of the matrix restoration constraint value in the restoration matrix according to the position where the certain reference value in the matrix to be restored is present, restore other elements except the position where the certain reference value in the matrix to be restored is present according to the matrix restoration constraint value to obtain the restoration matrix, and determine the obtained restoration matrix as the multiplication result of the input multiplicand matrix and the input multiplier matrix.

The position of the matrix restoration constraint value in the restoration matrix may be the same as the position of the certain reference value in the restoration matrix.

When the matrix restoration constraint value includes the constraint maximum value and the constraint minimum value, and the certain reference value includes the element maximum value and the element minimum value, the matrix restoration module 40 may determine the constraint maximum value as the restoration element maximum value of the restoration matrix, determine the position of the element maximum value in the matrix to be restored as the position of the constraint maximum value in the restoration matrix, determine the constraint minimum value as the restoration element minimum value of the restoration matrix, determine the position of the element minimum value in the matrix to be restored as the position of the constraint minimum value in the restoration matrix, and restore other elements in the matrix to be restored according to the restoration element maximum value, the restoration element minimum value, the constraint maximum value, and the constraint minimum value to obtain the restoration matrix.

In response to an element value of an element among the other elements being a positive number, the matrix restoration module 40 may compute the product of the element value of the element among the other elements and the restoration element maximum value, compute the ratio of the computed product and the element maximum value, and determine the computed ratio as an element value of the element among the other elements after restoration.

In response to the element value of the element among the other elements being a negative number, the matrix restoration module 40 may compute the product of the element value of the element among the other elements and the restoration element minimum value, compute the ratio of the product and the element minimum value, and determine the computed ratio as the element value of the element among the other elements after restoration.

In response to the element value of the element among other elements being zero, the element value of the any other element after restoration may still be zero.

Figure 15:
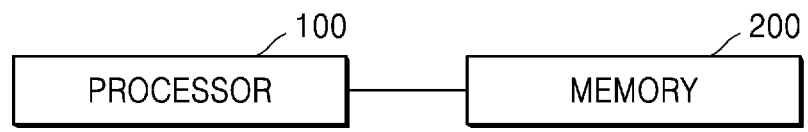
FIG. 15 is a block diagram of a computing device, according to an embodiment.

FIG. 15 is a block diagram of a computing device, according to an embodiment.

As shown in FIG. 15, the computing device may include, for example, a processor 100 and a memory 200. The memory 200 is configured to store computer programs. The computer program is executed by the processor 100 to cause the processor 100 to execute the matrix multiplication computation method described above.

According to an embodiment the disclosure herein, a computer-readable storage medium storing a computer program may be provided. The computer readable storage medium stores a computer program that, when executed by a processor, causes the processor to perform the above-described matrix multiplication computation method. The computer readable recording medium may be any data storage device that may store data read by a computer system. Examples of the computer-readable recording medium include: read-only memory, random access memory, read-only optical disks, magnetic tapes, floppy disks, optical data storage devices, and carrier waves (such as data transmission through the Internet via wired or wireless transmission paths).

The matrix multiplication computation method and device may be deployed in various servers, PC terminals and web pages, and may be applied to high-performance numerical computation of a graphic processing unit (GPU) and a tensor processor (TPU).

According to an embodiment, a quantization and inverse quantization method capable of supporting a float matrix multiplication on an int8 type data computation device are provided. The matrix multiplication computation method and device may improve the speed of float matrix multiplication while maintaining a small computation error.

According to an embodiment, a matrix multiplication computation method may include determining a first multiplication matrix and a second multiplication matrix, based on an input multiplicand matrix and an input multiplier matrix; determining a matrix to be restored based on the first multiplication matrix and the second multiplication matrix; determining a matrix restoration constraint value based on the matrix to be restored; and determining a multiplication result of the input multiplicand matrix and the input multiplier matrix, based on the matrix restoration constraint value and the matrix to be restored. The matrix multiplication computation method may improve the speed of matrix multiplication.

Alternatively, the determining of the first multiplication matrix and the second multiplication matrix based on the input multiplicand matrix and the input multiplier matrix may include quantizing elements of the input multiplicand matrix and the input multiplier matrix, based on a positive number interval of a multiplication matrix value range and a negative number interval of the multiplication matrix value range to obtain the first multiplication matrix and the second multiplication matrix, and a numerical range of the positive number interval may be asymmetric with a numerical range of the negative number interval. The matrix multiplication computation method may effectively reduce computation errors and increase accuracy of computation.

Alternatively, the determining of the matrix restoration constraint value based on the matrix to be restored may include determining a position where a certain reference value in the matrix to be restored is present; extracting a row vector and a column vector corresponding to the position where the certain reference value is present from the input multiplicand matrix and the input multiplier matrix, respectively; and determining the matrix restoration constraint value by using the row vector and the column vector. The matrix multiplication computation method may effectively increase accuracy of matrix restoration.

Alternatively, the matrix restoration constraint value may include a constraint maximum value and a constraint minimum value, and the certain reference value includes an element maximum value and an element minimum value. The constraint maximum value may be determined by: determining a first position where the element maximum value in the matrix to be restored is present; extracting a first row vector corresponding to a number of a row in which the first position is present from the input multiplicand matrix; extracting a first column vector corresponding to a number of a column in which the first position is present from the input multiplier matrix; and multiplying the first row vector with the first column vector to obtain the constraint maximum value. The constraint minimum value may be determined by: determining a second position where the element minimum value in the matrix to be restored is present; extracting a second row vector corresponding to a number of a row in which the second position is present rom the input multiplicand matrix; extracting a second column vector corresponding to a number of a column in which the second position is present from the input multiplier matrix; and multiplying the second row vector and the second column vector to obtain the constraint minimum value. The matrix multiplication computation method may improve the accuracy of determining each element value in the reconstruction matrix.

Alternatively, the determining of the multiplication result of the input multiplicand matrix and the input multiplier matrix, based on the matrix restoration constraint value and the matrix to be restored may include determining a position of the matrix restoration constraint value in a restoration matrix, based on a position where a certain reference value in the matrix to be restored is present; and restoring other elements excluding the position where the certain reference value in the matrix to be restored is present, based on the matrix restoration constraint value to obtain the restoration matrix, and determining the restoration matrix as the multiplication result of the input multiplicand matrix and the input multiplier matrix. The matrix multiplication computation method may not only improve the speed of matrix restoration, but may also improve the accuracy of matrix restoration.

Alternatively, the position of the matrix restoration constraint value in the restoration matrix may be the same as the position of the certain reference value in the matrix to be restored. The matrix multiplication computation method may be helpful in improving the matrix restoration speed.

Alternatively, the matrix restoration constraint value may include a constraint maximum value and a constraint minimum value, and the certain reference value may include an element maximum value and an element minimum value, and the restoring of the other elements excluding the position where the certain reference value in the matrix to be restored is present, based on the matrix restoration constraint value to obtain the restoration matrix, may include determining the constraint maximum value as a restoration element maximum value of the restoration matrix, and determining a position of the element maximum value in the matrix to be restored as a position of the constraint maximum value in the restoration matrix; determining the constraint minimum value as a restoration element minimum value of the restoration matrix, and determining a position of the element minimum value in the matrix to be restored as a position of the constraint minimum value in the restoration matrix; and restoring the other elements based on the restoration element maximum value, the restoration element minimum value, the constraint maximum value and the constraint minimum value to obtain the restoration matrix. The matrix multiplication computation method may ensure the accuracy of matrix restoration by dynamically determining the constraint maximum value and the constraint minimum value, and effectively improve the matrix reconstruction speed.

Alternatively, the restoring of an element among the other elements in the matrix to be restored may be performed by: in response to an element value of the element among the other elements being a positive number, computing a product of the element value of the element among the other elements and the restoration element maximum value, computing a ratio of the product and the element maximum value, and determining the computed ratio as an element value of the element among the other elements after restoration; in response to the element value of the element among the other elements being a negative number, computing a product of the element value of the element among the other elements and the restoration element minimum value, computing a ratio of the product and the element minimum value, and determining the computed ratio as the element value of the element among the other elements after restoration; and in response to the element value of the element among the other elements being is zero, determining the element value of the element among the other elements after restoration as zero. The matrix multiplication computation method helps to improve the accuracy of determining the value of each element of the restored matrix.

Alternatively, the input multiplicand matrix and the input multiplier matrix may include float matrices, and the first multiplication matrix and the second multiplication matrix may include integer matrices. The matrix multiplication computation method may effectively improve the matrix multiplication speed of afloat matrix.

According to an aspect of another embodiment, a matrix multiplication computation device includes a quantization module configured to determine a first multiplication matrix and a second multiplication matrix, based on an input multiplicand matrix and an input multiplier matrix; a matrix operation module configured to determine a matrix to be restored, based on the first multiplication matrix and the second multiplication matrix; a constraint value determining module configured to determine a matrix restoration constraint value, based on the matrix to be restored; and a matrix restoration module configured to determine a multiplication result of the input multiplicand matrix and the input multiplier matrix, based on the matrix restoration constraint value and the matrix to be restored. The matrix multiplication computation device may improve the speed of matrix multiplication and reduce computation errors.

Alternatively, the quantization module may quantize elements of the input multiplicand matrix and the input multiplier matrix, based on a positive number interval of a multiplication matrix value range and a negative number interval of the multiplication matrix value range to obtain the first multiplication matrix and the second multiplication matrix, and a numerical range of the positive number interval may be asymmetric with a numerical range of the negative number interval. The matrix multiplication calculation device may effectively reduce computation errors and increase accuracy of computation.

Alternatively, the constraint value determination module may include a position determination sub-module configured to determine a position where a certain reference value in the matrix to be restored is present; a vector extraction sub-module configured to extract a row vector and a column vector corresponding to the position where the certain reference value is present from the input multiplicand matrix and the input multiplier matrix, respectively; and a restoration constraint value sub-module configured to determine the matrix restoration constraint value by using the row vector and the column vector. The matrix multiplication calculation device may effectively improve the accuracy of matrix restoration.

Alternatively, the matrix restoration constraint value may include a constraint maximum value and a constraint minimum value, and the certain reference value may include an element maximum value and an element minimum value. The position determination sub-module may determine a first position where the element maximum value in the matrix to be restored is present, the vector extracting sub-module may extract a first row vector corresponding to a number of a row in which the first position is present from the input multiplicand matrix and extract a first column vector corresponding to a number of a column in which the first position is present from the input multiplier matrix, and the restoration constraint value determination sub-module may multiply the first row vector with the first column vector to obtain the constraint maximum value. The position determination sub-module may determine a second position where the element minimum value in the matrix to be restored is present, the vector extracting sub-module may extract a second row vector corresponding to a number of a row in which the second position is present rom the input multiplicand matrix and extract a second column vector corresponding to a number of a column in which the second position is present from the input multiplier matrix, and the restoration constraint value determination sub-module may multiply the second row vector and the second column vector to obtain the constraint minimum value. The matrix multiplication calculation device may improve the accuracy of determining each element value of the restoration matrix.

Alternatively, the matrix restoration module may determine a position of the matrix restoration constraint value in a restoration matrix, based on a position where a certain reference value in the matrix to be restored is present; and restore other elements excluding the position where the certain reference value in the matrix to be restored is present based on the matrix restoration constraint value to obtain the restoration matrix, and determine the restoration matrix as the multiplication result of the input multiplicand matrix and the input multiplier matrix. The matrix multiplication calculation device may not only improve the speed of matrix restoration, but also improve the accuracy of matrix restoration.

Alternatively, the position of the matrix restoration constraint value in the restoration matrix may be the same as the position of the certain reference value in the matrix to be restored. The matrix multiplication calculation device is helpful in improving the speed of matrix restoration.

Alternatively, the matrix restoration constraint value may include a constraint maximum value and a constraint minimum value, and the certain reference value may include an element maximum value and an element minimum value, and the matrix restoration module may determine the constraint maximum value as a restoration element maximum value of the restoration matrix, determine a position of the element maximum value in the matrix to be restored as a position of the constraint maximum value in the restoration matrix; determine the constraint minimum value as a restoration element minimum value of the restoration matrix, determine a position of the element minimum value in the matrix to be restored as a position of the constraint minimum value in the restoration matrix; and restore the other elements based on the restoration element maximum value, the restoration element minimum value, the constraint maximum value and the constraint minimum value to obtain the restoration matrix. The matrix multiplication calculation device may dynamically determine the constraint maximum value and the constraint minimum value to ensure the accuracy of matrix restoration and effectively improve the speed of matrix restoration.

Alternatively, the matrix restoration module may restore the other elements in the matrix to be restored by: in response to an element value of an element among the other elements being a positive number, computing a product of the element value of the element among the other elements and the restoration element maximum value, computing a ratio of the product and the element maximum value, and determining the computed ratio as an element value of the element among the other elements after restoration; in response to the element value of the element among the other elements being a negative number, computing a product of the element value of the element among the other elements and the restoration element minimum value, computing a ratio of the product and the element minimum value, and determining the computed ratio as the element value of the element among the other elements after restoration; and, in response to the element value of the other element among the other elements being zero, determining the element value of the element among the other elements after restoration as zero. The matrix multiplication calculation device may improve the accuracy of determining the value of each element of the restored matrix.

Alternatively, the input multiplicand matrix and the input multiplier matrix may include float matrices, and the first multiplication matrix and the second multiplication matrix may include integer matrices. The matrix multiplication calculation device may effectively improve the matrix multiplication speed of the float matrix.

According to an aspect of another embodiment, a computing device includes a processor and a memory storing a computer program, wherein when the computer program is executed by the processor, the computing device may implement the matrix multiplication computation method.

According to an aspect of another embodiment, a computer-readable storage medium stores a computer program, and, when the computer program is executed by a processor, the computer-readable storage medium may implement the matrix multiplication computation method.

A matrix multiplication calculation method and device disclosed herein may reduce computation errors and simultaneously increase the speed of matrix multiplication.

The quantization module 10, the matrix operation module 20, the constraint value determination module 30, the matrix restoration module 40, the position determination sub-module 301, the vector extraction sub-module 302, the restoration constraint value determination sub-module 303, the processor 100, the memory 200, the processors, and the memories in FIGS. 1 to 15 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 15 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, comprising:
    determining a first multiplication matrix and a second multiplication matrix, based on an input multiplicand matrix and an input multiplier matrix that are generated from an input signal;
    determining a matrix to be restored, based on the first multiplication matrix and the second multiplication matrix;
    determining a matrix restoration constraint value, based on the matrix to be restored;
    determining a multiplication result of the input multiplicand matrix and the input multiplier matrix, based on the matrix restoration constraint value and the matrix to be restored; and
    analyzing the input signal based on the multiplication result,
    wherein the determining of the matrix restoration constraint value comprises:
        determining a position where a certain reference value in the matrix to be restored is present;
        extracting a row vector and a column vector corresponding to the position where the certain reference value is present from the input multiplicand matrix and the input multiplier matrix, respectively; and
        determining the matrix restoration constraint value by using the row vector and the column vector.

2. The processor-implemented method of claim 1, wherein the determining of the first multiplication matrix and the second multiplication matrix comprises:
    quantizing elements of the input multiplicand matrix and the input multiplier matrix, based on a positive number interval of a multiplication matrix value range and a negative number interval of the multiplication matrix value range, to obtain the first multiplication matrix and the second multiplication matrix,
    wherein a numerical range of the positive number interval is asymmetric with a numerical range of the negative number interval.

3. The processor-implemented method of claim 1, wherein the matrix restoration constraint value comprises a constraint maximum value and a constraint minimum value, and the certain reference value comprises an element maximum value and an element minimum value, and
    wherein the constraint maximum value is determined by:
        determining a first position where the element maximum value in the matrix to be restored is present,
        extracting a first row vector corresponding to a number of a row in which the first position is present from the input multiplicand matrix,
        extracting a first column vector corresponding to a number of a column in which the first position is present from the input multiplier matrix, and
        multiplying the first row vector with the first column vector to obtain the constraint maximum value, and/or,
    wherein the constraint minimum value is determined by:
        determining a second position where the element minimum value in the matrix to be restored is present,
        extracting a second row vector corresponding to a number of a row in which the second position is present from the input multiplicand matrix,
        extracting a second column vector corresponding to a number of a column in which the second position is present from the input multiplier matrix, and
        multiplying the second row vector and the second column vector to obtain the constraint minimum value.

4. A processor-implemented method, comprising:
    determining a first multiplication matrix and a second multiplication matrix, based on an input multiplicand matrix and an input multiplier matrix that are generated from an input signal;
    determining a matrix to be restored, based on the first multiplication matrix and the second multiplication matrix;
    determining a matrix restoration constraint value, based on the matrix to be restored;
    determining a multiplication result of the input multiplicand matrix and the input multiplier matrix, based on the matrix restoration constraint value and the matrix to be restored; and
    analyzing the input signal based on the multiplication result,
    wherein the determining of the multiplication result of the input multiplicand matrix and the input multiplier matrix comprises:
        determining a position of the matrix restoration constraint value in a restoration matrix based on a position where a certain reference value is present in the matrix to be restored; and
        restoring other elements excluding the position where the certain reference value in the matrix to be restored is present, based on the matrix restoration constraint value, to obtain the restoration matrix, and determining the restoration matrix as the multiplication result of the input multiplicand matrix and the input multiplier matrix.

5. The processor-implemented method of claim 4, wherein the position of the matrix restoration constraint value in the restoration matrix is the same as the position of the certain reference value in the matrix to be restored.

6. The processor-implemented method of claim 5, wherein the matrix restoration constraint value comprises a constraint maximum value and a constraint minimum value, and the certain reference value comprises an element maximum value and an element minimum value, and
wherein the restoring of the other elements excluding the position where the certain reference value in the matrix to be restored is present comprises:
determining the constraint maximum value as a restoration element maximum value of the restoration matrix, and determining a position of the element maximum value in the matrix to be restored as a position of the constraint maximum value in the restoration matrix;
determining the constraint minimum value as a restoration element minimum value of the restoration matrix, and determining a position of the element minimum value in the matrix to be restored as a position of the constraint minimum value in the restoration matrix; and
restoring the other elements based on the restoration element maximum value, the restoration element minimum value, the constraint maximum value, and the constraint minimum value to obtain the restoration matrix.

7. The processor-implemented method of claim 6, wherein the restoring of the other elements in the matrix to be restored is performed by:
in response to an element value of an element among the other elements being a positive number, computing a product of the element value of the element among the other elements and the restoration element maximum value, computing a ratio of the product and the element maximum value, and determining the computed ratio as an element value of the element among the other elements after restoration;
in response to the element value of the element among the other elements being a negative number, computing a product of the element value of the element among the other elements and the restoration element minimum value, computing a ratio of the product and the element minimum value, and determining the computed ratio as the element value of the element among the other elements after restoration; and
in response to the element value of the element among the other elements being zero, determining the element value of the element among the other elements after restoration as zero.

8. The processor-implemented method of claim 1, wherein the input multiplicand matrix and the input multiplier matrix each comprise a float matrix, and the first multiplication matrix and the second multiplication matrix each comprise an integer matrix.

9. A non-transitory computer-readable storage medium storing instructions that, when executed by a processor, cause the processor to perform the processor-implemented method of claim 1.

10. A processing device, comprising:
one or more processors configured to:
determine a first multiplication matrix and a second multiplication matrix, based on an input multiplicand matrix and an input multiplier matrix that are generated from a signal;
determine a matrix to be restored, based on the first multiplication matrix and the second multiplication matrix;
determine a matrix restoration constraint value, based on the matrix to be restored;
determine a multiplication result of the input multiplicand matrix and the input multiplier matrix, based on the matrix restoration constraint value and the matrix to be restored; and
analyze the input signal based on the multiplication result of the input multiplicand matrix and the input multiplier matrix,
wherein the one or more processors comprise:
a quantization module configured to determine the first multiplication matrix and the second multiplication matrix, based on the input multiplicand matrix and the input multiplier matrix;
a matrix operation module configured to determine the matrix to be restored, based on the first multiplication matrix and the second multiplication matrix;
a constraint value determining module configured to determine the matrix restoration constraint value, based on the matrix to be restored; and
a matrix restoration module configured to determine the multiplication result of the input multiplicand matrix and the input multiplier matrix, based on the matrix restoration constraint value and the matrix to be restored,
wherein the constraint value determination module comprises:
a position determination sub-module configured to determine a position where a certain reference value in the matrix to be restored is present;
a vector extraction sub-module configured to extract a row vector and a column vector corresponding to the position where the certain reference value is present from the input multiplicand matrix and the input multiplier matrix, respectively; and
a restoration constraint value sub-module configured to determine the matrix restoration constraint value by using the row vector and the column vector.

11. The processing device of claim 10, wherein the quantization module is further configured to quantize elements of the input multiplicand matrix and the input multiplier matrix, based on a positive number interval of a multiplication matrix value range and a negative number interval of the multiplication matrix value range, to obtain the first multiplication matrix and the second multiplication matrix, and
wherein a numerical range of the positive number interval is asymmetric with a numerical range of the negative number interval.

12. The processing device of claim 10, wherein the matrix restoration constraint value comprises a constraint maximum value and a constraint minimum value, and the certain reference value comprises an element maximum value and an element minimum value, and
wherein the position determination sub-module is further configured to determine a first position where the element maximum value in the matrix to be restored is present, extract a first row vector corresponding to a number of a row in which the first position is present from the input multiplicand matrix, and extract a first column vector corresponding to a number of a column in which the first position is present from the input multiplier matrix, and the restoration constraint value determination sub-module is configured to multiply the first row vector with the first column vector to obtain the constraint maximum value, and/or, wherein the position determination sub-module is further configured to determine a second position where the element minimum value in the matrix to be restored is present, the vector extracting sub-module is configured to extract a second row vector corresponding to a row number where the second position is present from the input multiplicand matrix and extract a second column vector corresponding to a column number where the second position is present from the input multiplier matrix, and the restoration constraint value determination sub-module is configured to multiply the second row vector and the second column vector to obtain the constraint minimum value.

13. A processing device, comprising:

one or more processors configured to:
   determine a first multiplication matrix and a second multiplication matrix, based on an input multiplicand matrix and an input multiplier matrix that are generated from a signal;
   determine a matrix to be restored, based on the first multiplication matrix and the second multiplication matrix;
   determine a matrix restoration constraint value, based on the matrix to be restored;
   determine a multiplication result of the input multiplicand matrix and the input multiplier matrix, based on the matrix restoration constraint value and the matrix to be restored; and
   analyze the input signal based on the multiplication result of the input multiplicand matrix and the input multiplier matrix, wherein the one or more processors comprise:
   a quantization module configured to determine the first multiplication matrix and the second multiplication matrix, based on the input multiplicand matrix and the input multiplier matrix;
   a matrix operation module configured to determine the matrix to be restored, based on the first multiplication matrix and the second multiplication matrix;
   a constraint value determining module configured to determine the matrix restoration constraint value, based on the matrix to be restored; and
   a matrix restoration module configured to determine the multiplication result of the input multiplicand matrix and the input multiplier matrix, based on the matrix restoration constraint value and the matrix to be restored, wherein the matrix restoration module is further configured to:
   determine a position of the matrix restoration constraint value in a restoration matrix based on a position where a certain reference value in the matrix to be restored is present;
   restore other elements excluding the position where the certain reference value in the matrix to be restored is present, based on the matrix restoration constraint value, to obtain the restoration matrix; and
   determine the restoration matrix as the multiplication result of the input multiplicand matrix and the input multiplier matrix.

14. The processing device of claim 13, wherein the position of the matrix restoration constraint value in the restoration matrix is the same as the position of the certain reference value in the matrix to be restored.

15. The processing device of claim 14, wherein the matrix restoration constraint value comprises a constraint maximum value and a constraint minimum value, and the certain reference value comprises an element maximum value and an element minimum value, and wherein the matrix restoration module is further configured to:
   determine the constraint maximum value as a restoration element maximum value of the restoration matrix;
   determine a position of the element maximum value in the matrix to be restored as a position of the constraint maximum value in the restoration matrix;
   determine the constraint minimum value as a restoration element minimum value of the restoration matrix;
   determine a position of the element minimum value in the matrix to be restored as a position of the constraint minimum value in the restoration matrix; and
   restore the other elements based on the restoration element maximum value, the restoration element minimum value, the constraint maximum value, and the constraint minimum value to obtain the restoration matrix.

16. The processing device of claim 15, wherein the matrix restoration module is further configured to restore the elements in the matrix to be restored by:
   in response to an element value of an element among the other elements being a positive number, computing a product of the element value of the element among the other elements and the restoration element maximum value, computing a ratio of the product and the element maximum value, and determining the computed ratio as an element value of the element among the other elements after restoration;
   in response to the element value of the element among the other elements being a negative number, computing a product of the element value of the element among the other elements and the restoration element minimum value, computing a ratio of the product and the element minimum value, and determining the computed ratio as the element value of the element among the other elements after restoration; and
   in response to the element value of the element among the other elements being zero, determining the element value of the element among the other elements after restoration as zero.

17. A computing device, comprising:

a processor; and a memory storing a computer program, wherein, the computing device is programed to perform the following steps:
   determining a first multiplication matrix and a second multiplication matrix, based on an input multiplicand matrix and an input multiplier matrix that are generated from an input signal;
   determining a matrix to be restored, based on the first multiplication matrix and the second multiplication matrix;
   determining a matrix restoration constraint value, based on the matrix to be restored;
   determining a multiplication result of the input multiplicand matrix and the input multiplier matrix, based on the matrix restoration constraint value and the matrix to be restored; and analyzing the input signal based on the multiplication result, wherein the determining of the matrix restoration constraint value comprises:

determining a position where a certain reference value in the matrix to be restored is present;

extracting a row vector and a column vector corresponding to the position where the certain reference value is present from the input multiplicand matrix and the input multiplier matrix, respectively; and determining the matrix restoration constraint value by using the row vector and the column vector.

\* \* \* \* \*